(12) United States Patent
Vicario

(10) Patent No.: US 6,988,324 B2
(45) Date of Patent: Jan. 24, 2006

(54) ADJUSTABLE MEASURING AND POINTING TOOL

(76) Inventor: Pier Giorgio Vicario, 17, Via Prazzole, Borgomanero (Novara), IT-28021 (IT)

( * ) Notice: Subject to any disclaimer, the term of this patent is extended or adjusted under 35 U.S.C. 154(b) by 0 days.

(21) Appl. No.: 10/776,011

(22) Filed: Feb. 10, 2004

(65) Prior Publication Data

US 2004/0211076 A1 Oct. 28, 2004

(30) Foreign Application Priority Data

Feb. 14, 2003 (IT) .......................... NO2003A0002

(51) Int. Cl.
*G01B 3/30* (2006.01)
(52) U.S. Cl. .............................. 33/812; 33/613; 33/484
(58) Field of Classification Search ................. 33/806, 33/810, 811, 812, 613, 203.2, 486, 42, 44, 33/484, 485; D10/72, 73; 248/266.11, 405, 248/411, 903; 269/303, 305, 315
See application file for complete search history.

(56) References Cited

U.S. PATENT DOCUMENTS

| | | | | |
|---|---|---|---|---|
| 180,362 A * | 7/1876 | Montgomery | ................ | 34/89.2 |
| 198,560 A * | 12/1877 | Bennett | ....................... | 34/89.2 |
| 630,248 A * | 8/1899 | Lynk | .............................. | 33/44 |
| 1,173,789 A * | 2/1916 | Fox | ................................ | 33/484 |
| 1,262,678 A * | 4/1918 | Lapoint | ........................ | 33/812 |
| 1,383,979 A * | 7/1921 | Bryant | ........................ | 269/309 |
| 1,392,125 A * | 9/1921 | Jacob et al. | ..................... | 33/42 |
| 2,078,601 A * | 4/1937 | Cutting | ......................... | 33/468 |
| 2,112,789 A * | 3/1938 | Frederick | .................... | 269/315 |
| 3,094,787 A * | 6/1963 | Moore | .......................... | 33/809 |
| 3,181,244 A * | 5/1965 | Sosa | ............................. | 33/811 |
| 3,425,127 A * | 2/1969 | Long et al. | .................... | 33/406 |
| 3,439,426 A * | 4/1969 | Wilson | ........................ | 33/32.2 |
| 3,503,131 A * | 3/1970 | Warner | ........................ | 33/810 |
| 4,060,902 A * | 12/1977 | Keller | .......................... | 33/403 |
| 4,227,314 A * | 10/1980 | Schliep | ......................... | 33/480 |
| 4,566,200 A * | 1/1986 | Brady et al. | .................... | 33/809 |
| 4,644,663 A * | 2/1987 | Needs | .......................... | 33/486 |
| 4,660,292 A * | 4/1987 | Richardson | ................... | 33/451 |
| 5,245,758 A * | 9/1993 | Riley | ........................... | 33/451 |
| 5,348,276 A * | 9/1994 | Blacker | ........................ | 269/88 |
| 5,353,509 A * | 10/1994 | Black | ........................... | 33/451 |
| 5,701,680 A * | 12/1997 | Garcia et al. | ................. | 33/526 |
| 5,771,597 A * | 6/1998 | Hopf | ............................ | 33/474 |
| 5,778,553 A * | 7/1998 | Hollensbe | ..................... | 33/810 |
| 5,915,806 A * | 6/1999 | Levee | ............................ | 33/42 |
| 5,937,531 A * | 8/1999 | Menk et al. | ................... | 33/613 |
| 6,266,889 B1 * | 7/2001 | Boyce | .......................... | 33/484 |
| 6,393,715 B1 * | 5/2002 | Ihle | .............................. | 33/669 |
| 6,901,674 B2 * | 6/2005 | Pieczynski | .................... | 33/511 |
| 2003/0229999 A1 * | 12/2003 | Rimback | ...................... | 33/613 |

* cited by examiner

*Primary Examiner*—R. Alexander Smith
(74) *Attorney, Agent, or Firm*—Hoffmann & Baron, LLP

(57) ABSTRACT

The present invention is related to an adjustable measuring and pointing tool to be used for construction material measurements in building and metallic carpentry, comprising a bar (1) preferably, but not exclusively, made of aluminium alloy, on which a graduated plane (4) is realized, which allows the material measurement, and one or more cursors (7) able to slide along the entire graduated plane (4) to obtain the desired measures, comprising at least one screw (8) with adjustment ring nut, to allow the locking on said bar (1) of said adjustable measuring and pointing tool once established the desired measure.

8 Claims, 5 Drawing Sheets

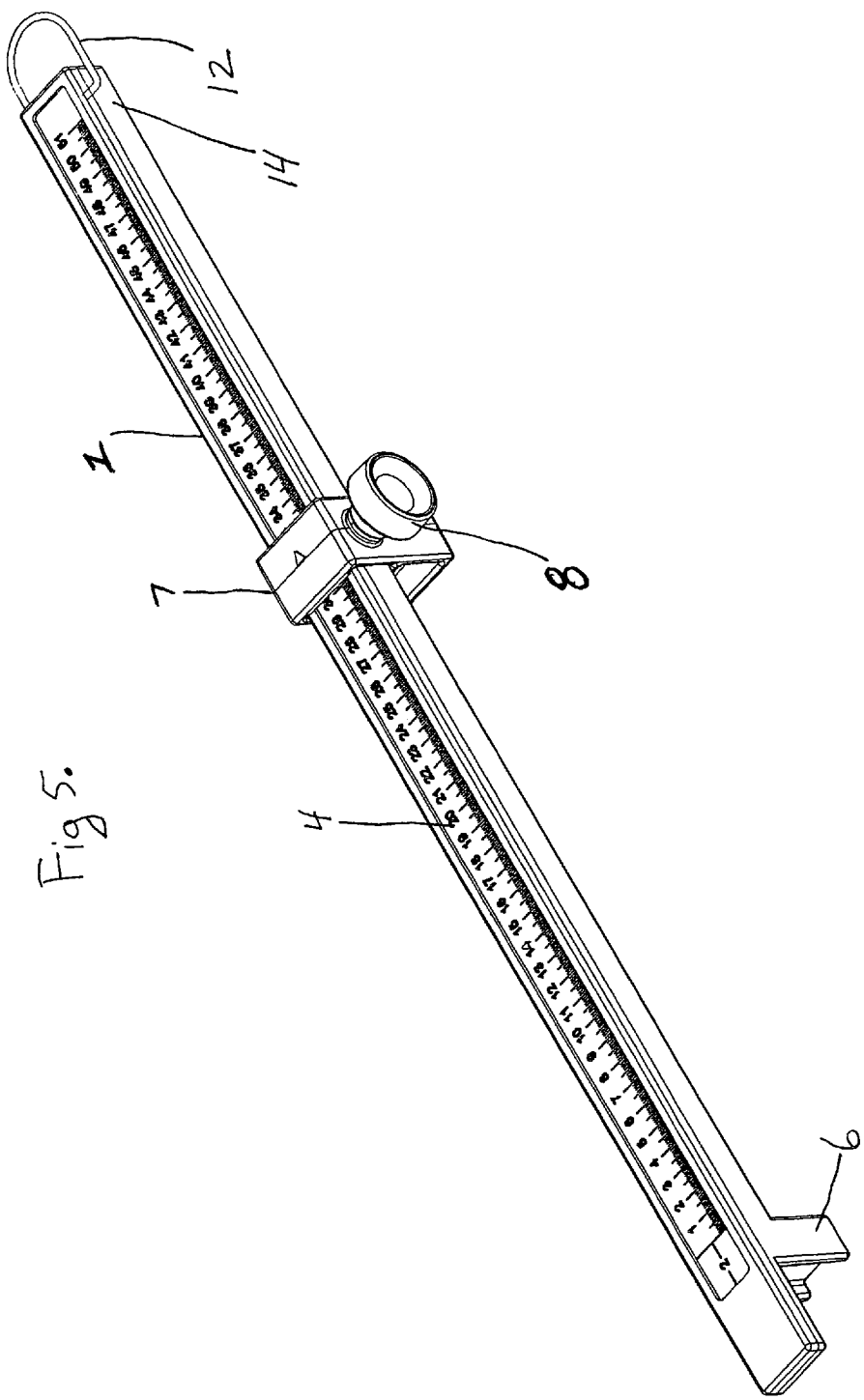

ADJUSTABLE MEASURING AND POINTING TOOL

This application claims priority from Italian Patent Application serial No. NO2003A000002 filed 14 Feb. 2003, which is incorporated herein by reference.

BACKGROUND OF THE INVENTION

The present invention is about an adjustable measuring and pointing tool to be used for measurements in building and metallic carpentry.

In carpentry works, in particular but not necessarily in the building field, exact measurements of building materials should often been done, before the installation of the same building materials. Before the realization of the present invention, the measurements for the lumber installation, for instance to build roof coverings in building field, took place directly cutting a wooden template in the yard. With such a system, a measuring tool primarily little precise and also little practical was obtained, as it was necessary to realize a new template, then thrown away when finished its use, whenever a new construction was started, or for each element having a different measure.

Object of the present invention is thus to provide for a carpentry measuring tool which solves the aforesaid problems, by a practical, precise, light and durable adjustable measuring and pointing tool.

SUMMARY OF THE INVENTION

The adjustable measuring and pointing tool according to the present invention, otherwise known as "list" or "step", is preferably made of aluminium alloy, and comprises one or more adjustable cursors, able to slide along the entire length of said adjustable measuring and pointing tool, and to be fixed to said adjustable measuring and pointing tool by screw clamps, to obtain the desired measures, for instance of fir fillets to build roof coverings, or to make manual pointing of carpentry metallic bars, for welding operations.

BRIEF DESCRIPTION OF THE DRAWINGS

Characteristics and advantages of the invention will be better described in greater detail hereinafter, also with the aid of the annexed drawings, which show a not limiting embodiment of the invention. Obviously, the same reference numbers in the different figures show the same or equivalent components.

FIG. 5 shows a perspective view of an alternative embodiment of the present invention.

DETAILED DESCRIPTION OF THE INVENTION

Figure 1:
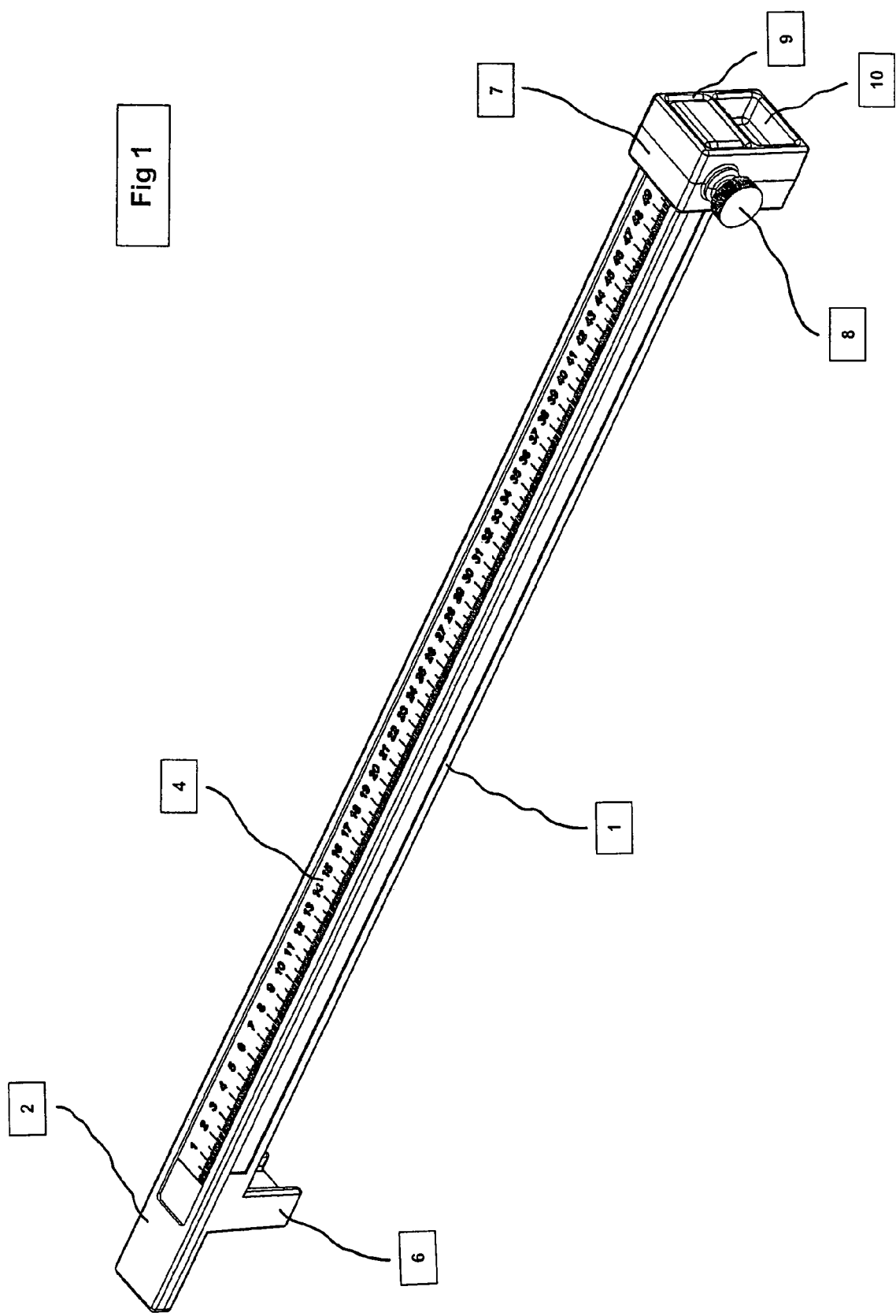
FIG. 1 shows an adjustable measuring and pointing tool according to the invention, in perspective view from above.
Figure 2:
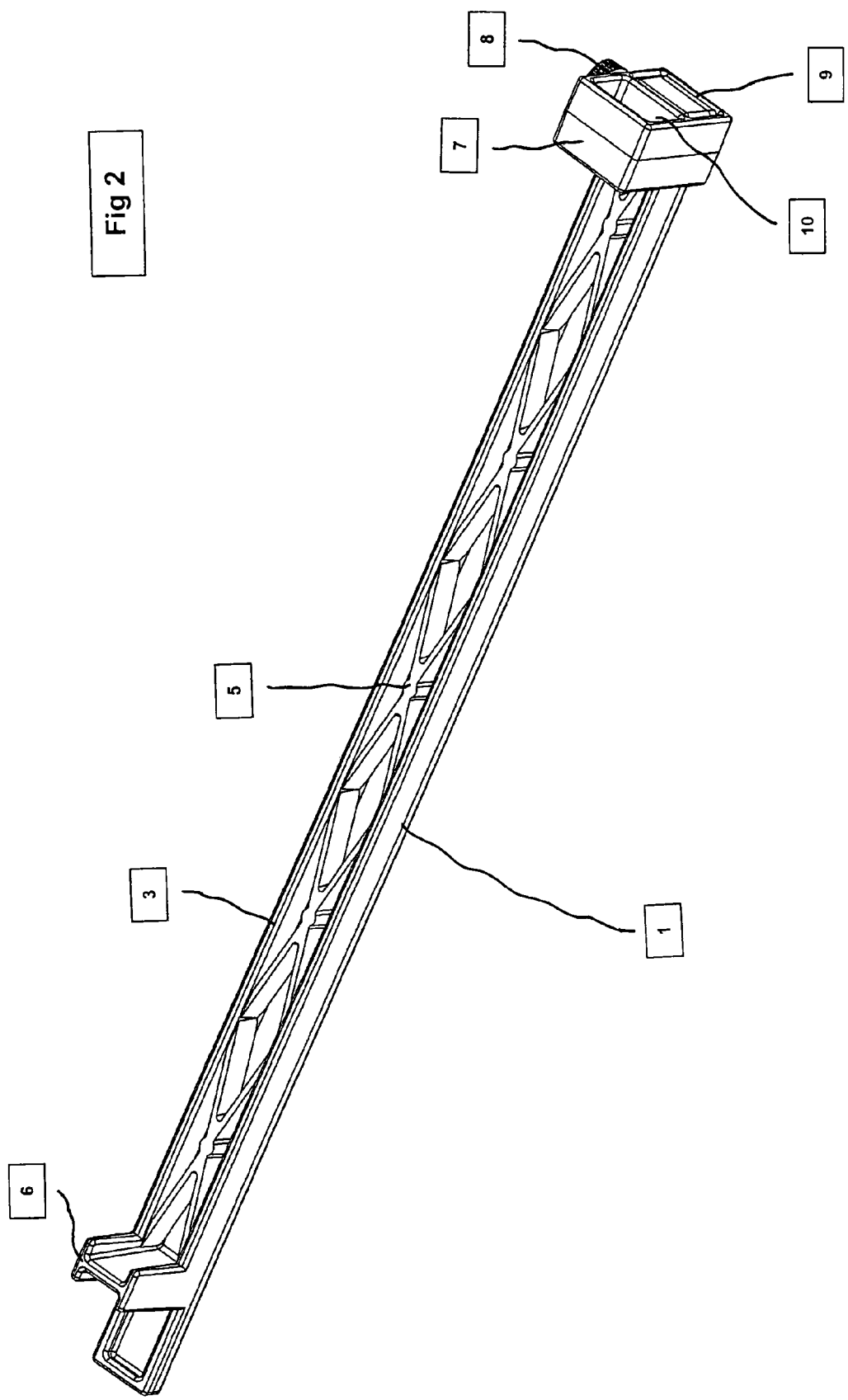
FIG. 2 shows an adjustable measuring and pointing tool according to the invention, in perspective view from below.

Referring to the figures of the annexed drawings, the adjustable measuring and pointing tool according to the present invention comprises a bar (1) preferably but not exclusively made of aluminium alloy, which has an upper plane (2) and a lower part (3), preferably provided with a reinforcement core (5) with rhomboidal structure, of the same material of said bar (1), to allow said adjustable measuring and pointing tool to be light and resistant. On the upper plane (2) of said bar (1) a graduated plane (4) is realized, which allows the material measurement. Said bar (1) of said adjustable measuring and pointing tool can also be provided with one or more support feet (6).

Figure 3:
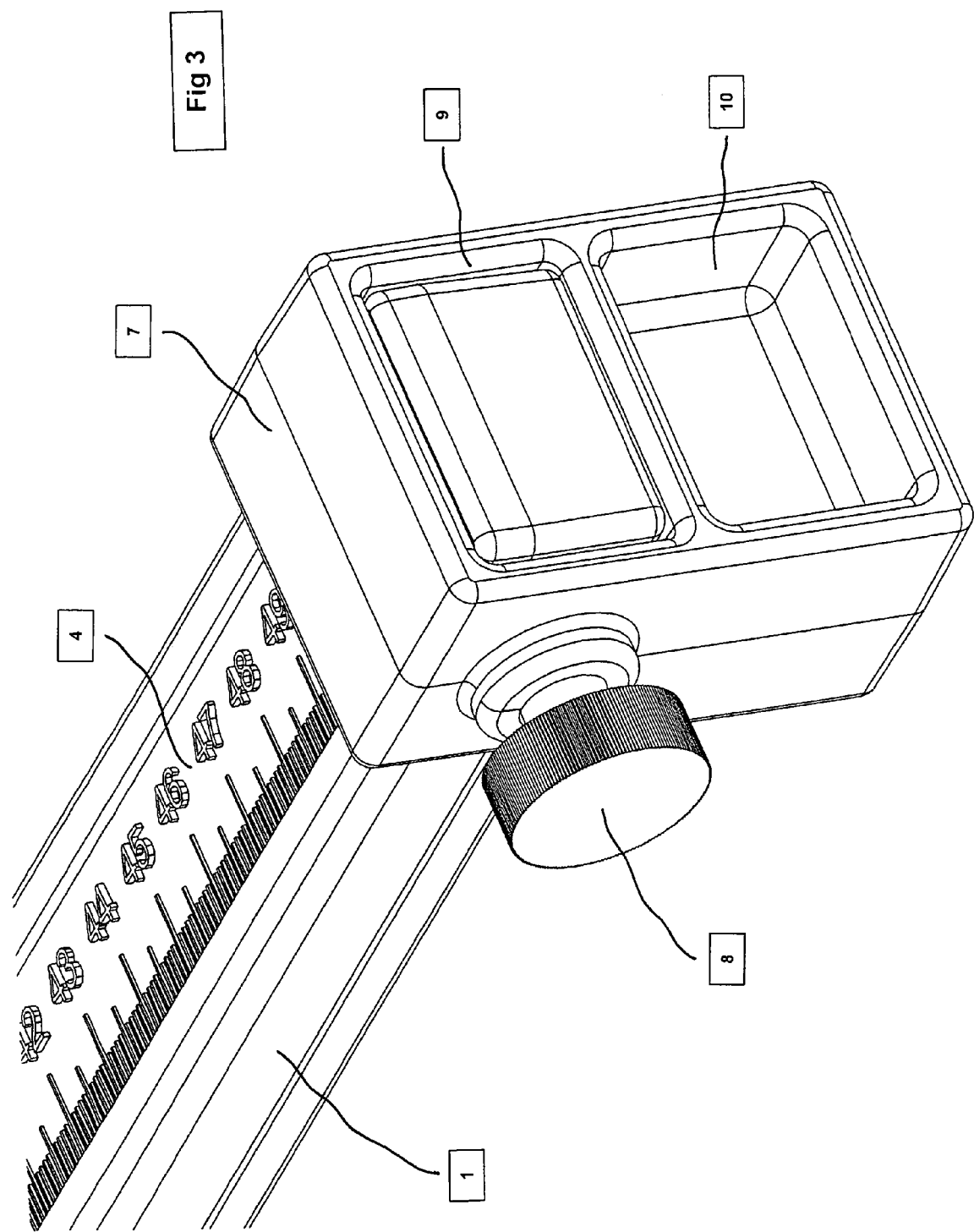
FIG. 3 shows an embodiment example of a cursor to be used in an adjustable measuring and pointing tool according to the invention.
Figure 4:
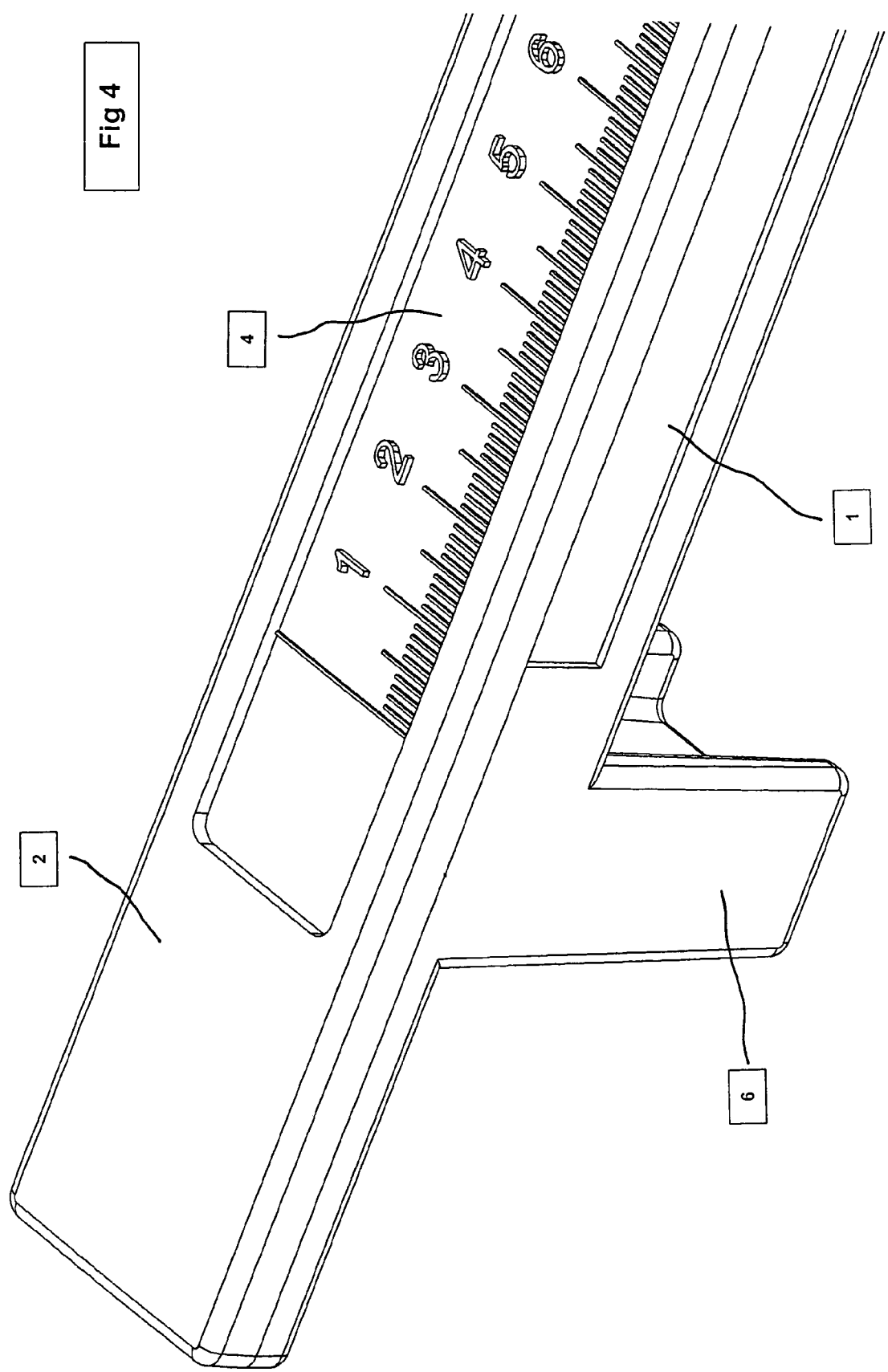
FIG. 4 shows an enlarged detail of an adjustable measuring and pointing tool according to the invention.

Advantageously, the adjustable measuring and pointing tool according to the present invention comprises one or more cursors (7), as shown in FIG. 3, preferable made of aluminum allow, able to slide along the entire graduated plane (4) of said bar (1) to obtain the desired measures. Said one or more cursors (7) are provided with an upper cavity (9), properly shaped to allow the insertion, on the manufacturing level, and the subsequent sliding of said one or more cursors (7) on said graduated plane (4), and with a lower cavity (10), preferably made to obtain a greater overall lightness of said adjustable measuring and pointing tool. Referring to FIG. 5. an alternative embodiment of the present invention is shown. A ring (12) can be attached to a free end (14) of the bar (1) to prevent the one or more cursors (7) from being accidentally released from the bar (1) during use. The ring (12) can be a U-shaped clip removably attached to the bar (1). The ring (12) can be spring loaded so that it is resiliently affachable and removable from the bar (1) when needed. Said one or more cursors (7) are furthermore provided with at least one screw (8) to form a thumbscrew to allow their locking on said bar (1) of said adjustable measuring and pointing tool once established the desired measures.

Using an adjustable measuring and pointing tool according to the present invention it is possible to measure several carpentry or building components, either made of wood, of metal or of other material, simply moving the cursor (7) on the graduated plane (4) or, in case more, accurate measures are required, or partial distances need to be calculated, it is possible to use more cursors (7), equally movable along the graduated plane (4) and independently fixable on it through the screw (8). The adjustable measuring and pointing tool according to the present invention is particularly useful in operations of welding more metallic components to each other, such as a window case components, by using more cursors (7) to perform several measurements at the same time and to make quicker and more accurate welding operations.

The adjustable measuring and pointing tool according to the present invention is therefore versatile and easy to handle, precise and light, thanks to the use of aluminium alloys, or other light metallic alloys, for its realization, practical and easily portable, thanks to the possibility to use a ring, not shown in the drawings, to hang up said adjustable measuring and pointing tool for instance to the users' belt.

It is therefore evident that alterations, adjustments and modifications may be resorted to the previously described embodiment, given as an illustrative example only, without falling outside scope of protection of the invention, as it is also defined in the appended claims.

What is claimed is:

1. An adjustable measuring and pointing tool, to be used for construction material measurements in building and metallic carpentry, comprising;

a bar (1) having an upper plane (2), which includes a graduated plane (4), a lower part (3) and one or more support feet (6) integrally formed in said lower part with an abutment for measuring aligned with zero on said graduated plane;

one or more cursors (7) able to slide along said entire graduated plane (4) of said bar (1) to obtain the construction material measurement; and a ring attached to said bar between said upper plane and said lower part that prevents said one or more cursors from being accidentally released from said bar and that is adapted to hang up said adjustable measuring and pointing tool for instance to the user's belt.

2. The adjustable measuring and pointing tool according to claim 1, wherein said one or more cursors (7) comprise at least one screw (8) with adjustment ring nut to allow said one or more cursors (7) locking on said bar (1) of said adjustable measuring and pointing tool once established the construction material desired measures.

3. The adjustable measuring and pointing tool according to claim 2, wherein said bar further comprises a sidewall extending substantially perpendicular from said upper plane of said bar to said lower part of said bar.

4. The adjustable measuring and pointing tool according to claim 3, wherein said cursor further comprises a top wall positioned substantially parallel to said upper plane of said bar and a cursor sidewall extending downwardly from said top wall and parallel to said sidewall of said bar, wherein said screw extends through said cursor sidewall.

5. The adjustable measuring and pointing tool according to claim 1, wherein said bar (1) is preferably made of aluminium alloy.

6. The adjustable measuring and pointing tool according to claim 1, wherein said one or more cursors (7) are preferably made of aluminium alloy.

7. The adjustable measuring and pointing tool according to claim 1, wherein said lower part (3) of said bar (1) is preferably provided with a reinforcement core (5) with rhomboidal structure made of aluminium alloy.

8. The adjustable measuring and pointing device according to claim 1, wherein said ring is U-shaped and removably attached to a free end of said bar.

\* \* \* \* \*